Patented Aug. 11, 1942

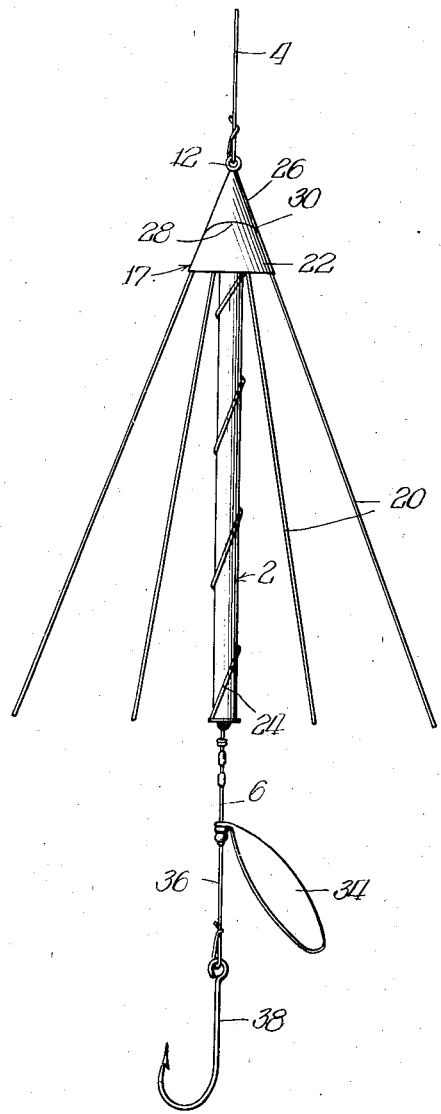
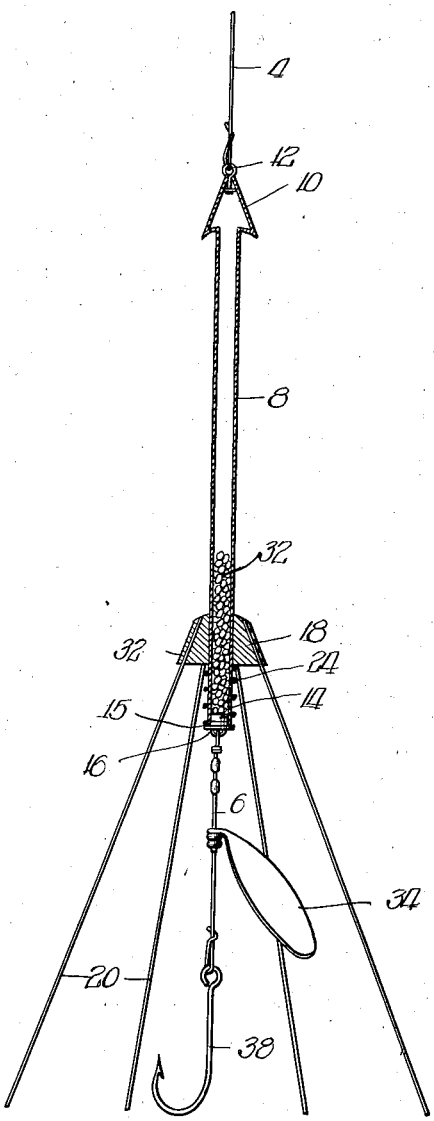

2,292,517

UNITED STATES PATENT OFFICE 2,292,517

FISHING TACKLE

Nelson L. Greene, Chicago, Ill.

Application March 10, 1941, Serial No. 382,494

15 Claims. (Cl. 43—39)

The present invention relates to fishing tackle, and more in particular to a weedless attachment or weed-guard adapted to be connected between a line and a lure, or the like.

Among the objects of the present invention is to provide a novel weed-guard adapted to be connected between a fish hook, lure or the like on the one side and a fish line on the other side, and embodying movable weed-guard elements normally disposed forwardly of the fish hook, lure or the like but movable relative thereto upon engaging any obstruction, such as weeds or the like, into a position encompassing and protecting said fish hook, lure or the like from said weeds so that the same may not become fouled at any time.

The present invention is predicated upon the theory of providing a novel weedless attachment or weed-guard adapted to be connected between a fish line and a fish hook, lure or the like and having the weed deflecting means or elements normally out of embracing or encompassing relation to said fish hook, lure or the like so as not to obstruct in any way the lure to prevent a fish striking at the same, yet movable in relation to said lure or the like to provide ample protection to prevent fouling of the fish hook, lure or the like when the same meets some obstruction in the form of weeds and other similar objects.

Still a further object of the present invention is to provide a weedless attachment or weed-guard of the type hereinabove exemplified, wherein means in the form of a resilient member is provided for normally urging the weed deflecting means or elements into a position free of the fish hook, lure or the like, yet permitting said weed deflecting means or elements to move into protecting relation to the said fish hook, lure or the like upon meeting with an obstruction and which will also return said weed deflecting means or elements into normal position after the device has become clear of the obstruction.

Another object within the purview of the present invention is to provide a novel weedless attachment or weed-guard of the type hereinbefore alluded to, embodying in its construction an air-tight tube serving to give maximum buoyancy to the entire device and permit it to float very close to the surface of the water in process of use. Further, the same tube provides means for receiving and holding a desired amount of weighty material in order that the lure with which the same is associated may be drawn through the water at any desired level during the use thereof.

As a still further object, the present invention comprehends a novel weedless attachment or weed-guard embodying in its assembly a member serving as a direct connection between a fish hook, lure or the like and a fishing line, and another member movably mounted with respect thereto into a plurality of positions, such movement being resisted by a resilient element which normally holds said last-named member in one of said positions during its normal use. More particularly, the first-named member is provided with an abutment head adapted to cooperate in abutting relation with said second-named member when the same is in its normal operative position. The invention comprehends the provision of cooperative abutting faces for said members interfitting to prevent relative rotational movement between said members.

As a further object of the present invention, the weedless attachment or weed-guard as immediately above described embodies an air-tight chamber in said first-named member for receiving weighty material for the purposes hereinabove described, which is normally closed by a removable element having means by which the fish hook, lure or the like is connected to the weedless attachment or weed-guard and further embodying in its construction an abutment disposed in opposed relation to the abutment head for the first-named member, between which and the head for said second-named member is disposed a resilient element, such as a coil spring or the like, for normally urging said second-named member into abutting relation to the abutment head for the first-named member.

Other objects, features, capabilities and advantages are comprehended by the invention, as will later appear and as are inherently possessed thereby.

Referring to the drawing:

Figure 1 is a view in elevation of a weedless attachment made in accordance with the present invention and showing the same connected between a line on one side and a lure on the other side; and Figure 2 is a view partly in elevation and partly in section of the device shown in Figure 1 of the drawing, disclosing parts thereof in another operative position.

Referring now more in detail to the drawing, an embodiment selected to illustrate the present invention is generally referred to as 2 and is shown in its normal operative relation between a fish line 4 on the one side and a lure 6 on the other side. The novel attachment in the assembly disclosed comprises a hollow tubular member 8 open at one end and formed with an abutment head 10 at its other end, which abutment head is provided with means in the form of an eye attachment 12 to which the line 4 can be connected. The opposed open end of this member 8 is internally threaded to receive a threaded plug 14 to close the chamber formed within the interior of the member 8 rendering it air-tight and buoyant and which plug is provided with means in the form of an eye 16 by which the lure 6 may be connected to the member 8. The attachment according to the present invention therefore embodies member 8 which constitutes a direct connection between the lure 6 and the line 4.

Mounted upon the member 8 for translatory or sliding movement with respect thereto is a weed-guard member 17 having its head 18 embracing the tubular member 8 and movable between the abutment head 10 and the abutment 15 formed as an annular flange on the removable plug 14. This weed-guard member 17 is further constituted by a plurality of weed deflecting elements 20 secured at one end in circumferential relation to the head 18 and flaring outwardly from the longitudinal axis of the head 18 and forming, in effect, a continuation of the cone-forming surface 22 forming the exterior face of the head 18. These weed deflecting elements 20 extend at their free end laterally of the lure 6 to completely encompass and embrace said lure when the said weed-guard member is in the position as shown in Figure 2 of the drawing, and are of flexible spring construction for return to their normal position, as shown in the figures, after being deflected by engagement with obstructions, such as weeds and the like.

The head 18 of the weed-guard member is normally urged into abutting relation with the abutment head 10 through the medium of a coil spring 24 which embraces the tubular member 8 and abuts the head 18 at one end and the abutment 15 at the other end. As clearly shown in the drawing, the abutment head 10 has its exterior face formed as by means of a cone-forming surface 26 which, when the head 18 is in abutting relation with the abutment head, constitutes a continuation of the cone-forming surface 22 of said weed-guard head so as to provide a continuous flow line contour at the forward end of the attachment to decrease resistance to movement while the same is being used under normal operating conditions. It is also to be observed that even when the head 18 of the weed-guard member is in the position as shown in Figure 2 of the drawing, resistance to movement is at a minimum because of the flow line contour of each of the exterior faces 22 and 26 of the weed-guard head 18 and the abutment head 10, respectively.

In order to prevent relative rotational movement of the weed-guard member with respect to the abutment head 10, the abutting surfaces of the head 18 and the abutment head 10 interfit by way of the opposed circumferentially disposed scalloped formations 28 and 30 which are maintained in their normal interfitting relation by virtue of the coil spring 24.

As will be clearly apparent from the above description, the device, under normal operating conditions, assumes the position as shown in Figure 1 of the drawing with respect to the lure 6.

It is desirable to provide a spring 24 of such resistance as to maintain the weed-guard member in normal abutting relation to the abutment head 10 during movement of the attachment through the water during a normal trolling operation, the said weed-guard member, when in that position, protecting the lure 6 and preventing fouling of the hook by the weeds and other material under most conditions. A weed or other obstruction, if non-resistant, coming in contact with one side only of the device will be displaced to clear the lure. A weed or other obstruction, if resistant, will displace the cone toward the opposite side, which action, by means of the rigidly disposed central tube, will displace the lure to a like degree in the same direction keeping it equally clear of the weed or obstruction. However, at times the lure may encounter substantial weed growths or other obstructions on both sides of the device at once, which would normally foul the lure 6 if the weed-guard member is maintained in the position as shown in Figure 1 of the drawing. Provision is made, however, in the present assembly to prevent such fouling of the hook under these conditions. Should the attachment encounter such weed growths or other obstructions, these weed growths or the like will force the weed-guard member rearwardly relative to the member 8 and into a position such as shown in Figure 2 of the drawing where the weed deflecting elements 20 completely encompass and embrace the lure 6 and protect the same against fouling under these conditions. Once the weed-guard member has traversed the weed growths or the like which forced it rearwardly into the position as shown in Figure 2 of the drawing, pressure will be released thereon and coil spring 24 will move the same forwardly with respect to member 8 whereby head 18 thereof again abuts the abutment head 10 which is in its normal operative position. Should the weed-guard member encounter additional weed formations or the like, the process would be repeated with full protection to the lure under such circumstances.

As a further novel feature of construction, the member 8 is made of hollow construction to provide an air-tight chamber for supplying buoyancy and for receiving weighty material 32, which may be in the form of lead balls, shot, sinkers and the like, to weight the combined attachment and lure to varying degrees required so that the same can be moved through the water at any depth desired. To vary this degree of buoyancy at will, by supplying either more or less of this weighty material, access to the chamber is readily gained through the removable closure plug 14.

It is also to be understood that while the lure 6 is shown in the drawing as comprising a spinner or spoon 34 swiveled to the wire element 36, and to the latter of which is attached a hook 38, nevertheless the weedless attachment or weed-guard may be used in connection with a plain hook carrying any desired form of bait or any other artificial lure than the one shown in the drawing, without departing from the spirit of the present invention.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. A weedless attachment adapted to be connected between a line and a fish-hook or the like, comprising a member having means adjacent one end thereof for attachment of said line and means adjacent the other end thereof for attachment of a fish-hook or the like thereto, a weed-guard mounted for relative longitudinal movement with respect to said member, and means normally resisting said relative movement of said weed-guard with respect to said member.

2. A weedless attachment adapted to be connected betwen a line and a fish-hook or the like, comprising a member having means adjacent one end thereof for attachment of said line and means adjacent the other end thereof for attachment of a fish-hook or the like thereto, a weed-guard mounted on said member for relative translatory movement longitudinally with respect thereto, and means between said member and said weed-guard normally resisting said relative movement of said weed-guard with respect to said member.

3. A weedless attachment adapted to be connected between a line and fish-hook or the like, comprising a member having means adjacent one end thereof for attachment of said line and means adjacent the other end thereof for attachment of a fish-hook or the like thereto, said member having an enclosed chamber for receiving weighted material, a weed-guard mounted for relative movement with respect to said member, and means normally resisting said relative movement of said weed-guard with respect to said member.

4. A weedless attachment adapted to be connected between a line and a fish-hook or the like, comprising a member having means adjacent one end thereof for attachment of said line and means adjacent the other end thereof for attachment of a fish-hook or the like thereto, said member having an enclosed chamber for receiving weighted material, a weed-guard mounted on said member for relative translatory movement with respect thereto, and means between said member and said weed-guard normally resisting said relative movement of said weed-guard with respect to said member.

5. A weedless attachment adapted to be connected between a line and a fish-hook or the like, comprising a member having spaced abutments and being provilded with means adjacent one end thereof for attachment of said line and means adjacent the other end thereof for attachment of a fish-hook or the like thereto, a weed-guard having a head mounted on said member for sliding movement relative thereto between said abutments, and resilient means between said head and one of said abutments for normally urging said head into abutting relation with the other of said abutments.

6. A weedless attachment adapted to be connected between a line and a lure or the like, comprising a member having means adjacent one end thereof for attachment of said line and means adjacent the other end thereof for attachment of a lure or the like thereto, a weed-guard having a head mounted on said member for sliding movement relative thereto and being provided with a plurality of weed deflecting elements extending therefrom, and resilient means normally urging said weed-guard forwardly of said lure or the like but retractible upon application of force to said weed-guard to permit movement thereof relative to said member to encompass and protect said lure or the like.

7. A weedless attachment adapted to be connected between a line and a lure or the like, comprising a member having means adjacent one end thereof for attachment of said line and means adjacent the other end thereof for attachment of a lure or the like thereto, said member having a head forming abutment at one end thereof to which said line is attached and an abutment adjacent the other end thereof, a weed-guard having a head mounted on said member between said abutments for sliding movement relative to said head and having a plurality of weed deflecting elements extending therefrom, and a coil spring disposed between said head and said second-named abutment for normally moving said head into abutting relation to said first-named abutment head.

8. A weedless attachment adapted to be connected between a line and a lure or the like, comprising a member having means adjacent one end thereof for attachment of said line and means adjacent the other end thereof for attachment of a lure or the like thereto, said member having a head forming abutment at one end thereof to which said line is attached and an abutment adjacent the other end thereof, a weed-guard having a head mounted on said member between said abutments for sliding movement relative to said head and having a plurality of weed-deflecting elements extending therefrom, and a coil spring disposed between said head and said second-named abutment for normally moving said head into abutting relation to said first-named abutment head, said abutment head and the head of said weed-guard having interfitting abutment faces to prevent relative rotational movement therebetween.

9. A weedless attachment adapted to be connected between a line and a lure or the like, comprising a member having means adjacent one end thereof for attachment of said line and means adjacent the other end thereof for attachment of a lure or the like thereto, said member having a head forming abutment at one end thereof to which said line is attached and an abutment adjacent the other end thereof, a weed-guard having a head mounted on said member between said abutments for sliding movement relative to said head and having a plurality of weed-deflecting elements extending therefrom, and a coil spring disposed between said head and said second-named abutment for normally moving said head into abutting relation to said first-named abutment head, said abutment head and the head of said weed-guard each having an outer surface providing a flow line contour and when in abutting relation to provide a composite head having an outer surface providing a flow line contour, the abutment faces of said abutment head and the head of said weed-guard interfitting in abutting relation to prevent relative rotational movement therebetween.

10. In a weedless attachment, the combination of a member having an abutment head, and a weed-guard having a head movable into abutting relation with said abutment head, said abutment head and the head of said weed-guard having interfitting abutment faces to prevent relative rotational movement therebetween.

11. In a weedless attachment, the combination of a member having an abutment head, and a weed-guard having a head movable into abutting relation with said abutment head, said abutment head and the head of said weed-guard having interfitting abutment faces to prevent relative rotational movement therebetween, said abutment head and the head of said weed-guard having their outer faces formed as cone-forming surfaces to form a flow line contour for said attachment when said abutment head and the head of said weed-guard are in abutting relation.

12. A weedless attachment adapted to be connected between a line and a lure or the like, comprising a member provided with a chamber and having means adjacent one end thereof for attachment of said line and means adjacent the other end thereof for attachment of a lure or the like thereto, said member having a head forming abutment at one end thereof to which said line is attached, a removable closure element for said chamber adjacent the other end of said member embodying said means for attachment of said lure or the like, said closure element having an abutment opposed to said first-named abutment, a weed-guard having a head mounted on said member between said abutments for sliding movement relative to said head and having a plurality of weed-deflecting elements extending therefrom, and a coil spring disposed between said head and said second-named abutment for normally moving said head into abutting relation to said first-named abutment head.

13. A weedless attachment adapted to be connected between a line and a lure or the like, embodying a hollow member having means at one end for attachment of said line thereto, a closure cap removably secured to the other end of said member and having means for attachment of said lure to said member.

14. A weedless attachment adapted to be connected between a line and a fish-hook or the like, comprising a member having means adjacent one end thereof for attachment of said line and means adjacent the other end thereof for attachment of a fish-hook or the like thereto, said member having an enclosed air-tight chamber for buoyancy adapted to receive weighted material, a weed-guard mounted for relative movement with respect to said member, and means normally resisting said relative movement of said weed-guard with respect to said member.

15. A weedless attachment adapted to be connected between a line and a fish-hook or the like, comprising a member having means adjacent one end thereof for attachment of said line and means adjacent the other end thereof for attachment of a fish-hook or the like thereto, said member having an enclosed air-tight chamber for buoyancy adapted to receive weighted material, a weed-guard mounted on said member for relative translatory movement with respect thereto, and means between said member and said weed-guard normally resisting said relative movement of said weed-guard with respect to said member.

NELSON L. GREENE.